United States Patent [19]

Lu

[11] 4,242,422
[45] Dec. 30, 1980

[54] BATTERY CONFIGURATION

[76] Inventor: Kau U. Lu, 6221 Foxshield Dr., Huntington Beach, Calif. 92647

[21] Appl. No.: 57,304

[22] Filed: Jul. 13, 1979

[51] Int. Cl.³ .......................................... H01M 10/12
[52] U.S. Cl. ........................................ 429/94; 429/96; 429/225
[58] Field of Search ................... 429/149, 94, 96, 133, 429/164, 225, 226, 228, 119, 209, 210, 98, 100

[56] References Cited

U.S. PATENT DOCUMENTS

| | | | |
|---|---|---|---|
| 2,534,056 | 12/1950 | Pitt | 429/210 |
| 3,332,804 | 7/1967 | Zaromb | 429/110 |
| 3,445,287 | 5/1969 | Scholzel | 429/204 |
| 3,472,696 | 10/1969 | Shoeld | 429/225 X |
| 3,490,954 | 1/1970 | Babuci et al. | 429/229 X |
| 3,497,393 | 2/1970 | Dreisbach et al. | 429/119 |
| 3,542,599 | 11/1970 | Fiandt | 429/119 |
| 3,856,575 | 12/1974 | Hughes | 429/179 X |

*Primary Examiner*—Anthony Skapars
*Attorney, Agent, or Firm*—Fulwider, Patton, Rieber, Lee & Utecht

[57] ABSTRACT

An electrical storage battery is constructed with anode and cathode plates arranged in a radial configuration within a cylindrical case. The plates are supported within a rack which maintains a proper radial alignment. The radial arrangement of the flat plates enhances the stability of current and voltage during discharge as contrasted with prior devices.

4 Claims, 4 Drawing Figures

BATTERY CONFIGURATION

BACKGROUND OF THE INVENTION

1. Field of the Invention

The present invention relates to electrical storage batteries.

2. Description of the Prior Art

Conventional lead-acid storage batteries are extensively utilized to provide an initial power source for starting internal combustion engines, especially in automotive vehicles. Such conventional batteries are formed with a plurality of parallel alternating anode and cathode plates arranged in a generally rectangular case. An electrolyte, typically a solution of suphuric acid, is utilized as an ion exchange medium. The battery is charged with direct current applied to the oppositely poled battery posts, one of which is electrically coupled to the anode plates and the other to the cathode plates. When the battery is charged, and anodes, or positive plates are formed of lead peroxide. The cathodes, or negative plates are comprised of finely divided or sponge lead. In the presence of the battery electrolyte the active anode and cathode plates are converted into lead sulfate at the expese of the acid radial of the electrolyte and with the formation of water during discharge. Precisely the reverse action takes place in charging the battery. Discharging and recharging can be repeated indefinitely.

Conventional storage batteries, and lead-acid storage batteries in automotive vehicles in particular, suffer from certain defects. Conventional lead-acid batteries have relatively low specific energy and only marginal peak power.

It has been widely assumed that a battery configuration in which opposing anodes and cathodes are positioned closely together in parallel interleaved arrangement is the most effective and efficient battery construction design. It has been assumed that sulphuric acid ions interact with the lead and lead peroxide molecules on either side of a quantity of electrolyte confined therebetween. It has further been assumed that this electrochemical interaction occurs only between contacting molecules and ions between each pair of adjacent, oppositely poled plates.

SUMMARY OF THE INVENTION

According to the present invention, however, it has been found that there are dynamic waves of concentrations of ionic charges in an electrolyte solution. These waves follow a circular or spiral pattern of high pressure areas between low pressure areas, and are not confined to interaction between adjacent plates in the storage battery. Rather, the storage battery plates are transparent to the circulating molecular wave patterns in the battery. The molecular wave patterns in an electrical storage battery are much the same as those described in conjunction with large, cosmic bodies. Mathematical models of galaxies, pulsars and continental drift in the earth are described in the following published articles: K.U. LU, Theory of Spiral Galaxies, Proceedings WAA/ALPO/AANC Conference, 1975 pages 121–124; K.U. LU, Dynamics of Differential Rotating Sphere and Pulsar, International Journal of Theoretical Physics, Vol. 15, No. 6, 1976, pages 411–415 and K.U. LU, Dynamics of Differential Rotating Sphere Earthquake and Continental Drift, Proceedings of the First International Conference on Mathematical Modeling, 1977, pages 2283–2288. It has been found that the movement of the sulphuric acid radials in a storage battery move according to the paths prescribed in these articles, are not merely in the gap between facing anode and cathode surfaces, as heretofore thought.

Since the ionic particles which effectuate electrolyte radical transfer and the consequent provision of electrical energy to anode and cathode plates are not confined to movement between adjacent plates, as previously thought, there is no particular benefit to arranging the plates in parallel fashion and as close as possible to each other, as taught in the prior art. Rather, and in accordance with the present invention, the plates in an electrical storage battery may be arranged in a radial pattern within a cylindrical casing. The plates are therefore more uniformly transverse with respect to the direction of propagation of molecular high pressure systems which proceed in generally circular paths from the center of such an arrangement. Ions can be accelerated into orderly circular motion, and as a consequence of this circular motion, density waves of the ions will be formed and will move in an orderly fashion. This promotes more efficient reaction of ion radicals and minimizes the energy loss due to unnecessary collisions among the ions themselves and collisions with the confining walls of the casing.

One particularly advantageous application of the battery of the invention is for use to power an automotive vehicle. Because of its unique construction the battery of the invention maintains a much more stable and even voltage and current output during discharge. It does not exhibit a decline in voltage and current output during discharge as do conventional lead-acid batteries. Accordingly, automotive vehicles powered by the battery of the invention do not suffer loss of power during use as would conventional batteries. The battery of the invention is therefore much more suitable for use as a principal power source for automotive vehicles compared with conventional batteries. Vehicles powered in this fashion contribute no pollution to the atmosphere and do not consume declining supplies of increasingly costly hydrocarbon fuel as do vehicles powered by internal combustion engines.

The invention may be described with greater particularly by reference to the accompanying drawings.

DESCRIPTION OF THE EMBODIMENT

Figure 1:
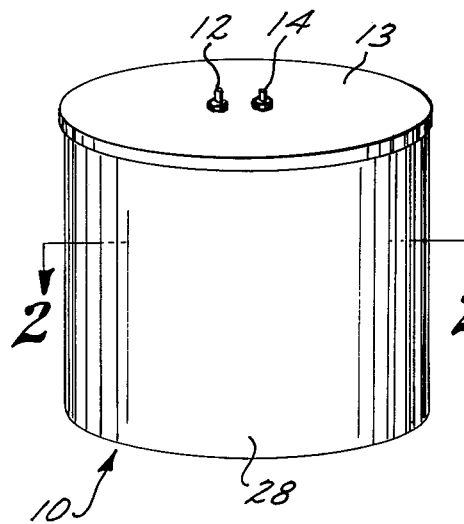
FIG. 1 is a perspective view of the exterior of the casing of a battery constructed according to the present invention.
Figure 2:
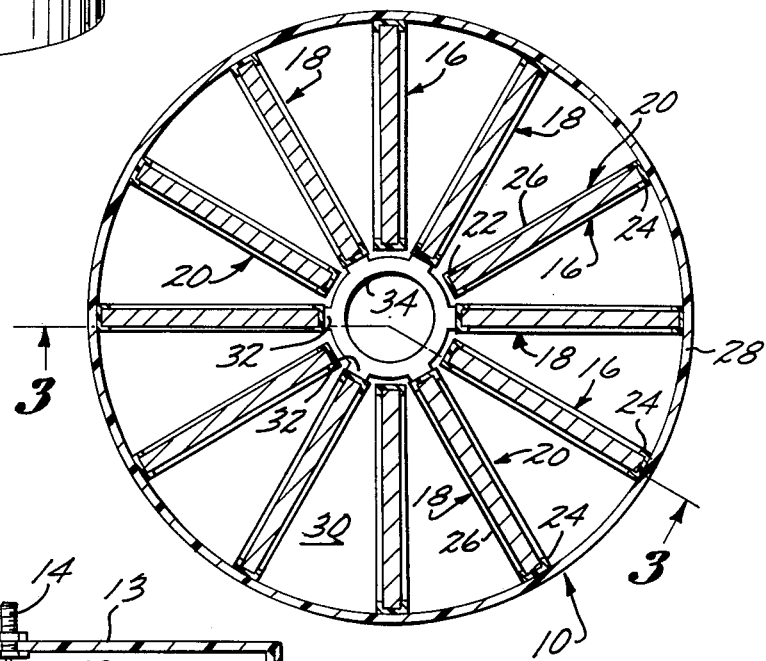
FIG. 2 is a plan sectional view taken along the lines 2—2 of FIG. 1.

FIG. 1 illustrates a drum-like cylindrical lead storage battery casing 10, according to the invention having an anode terminal post 12 and a cathode terminal post 14 near the center of the transverse upper cover 13 of the casing 10. As illustrated in FIG. 2, the battery of the invention is formed with a number of flat, lead anode plates 16 and cathode plates 18 arranged in alternation in the casing 10 and disposed therewithin in radial alignment in a circle, much like the spokes of a wheel. Each of the anode and cathode plates 16 and 18 is positioned within a generally upright U-shaped rack 20. Each rack 20 is formed with channels on three sides at opposed interior and exterior edge restraints 22 and 24 respectively, and with a channeled bottom support 26. The exterior edge supports 24 are fastened securely to the cylindrical wall 28 of the casing 10, while the bottom rack supports 26 are firmly secured to the floor 30 of the casing 10. The racks 20 thereby maintain each of the plates 16 and 18 in a vertical upright radially aligned disposition.

The floor 30 of the casing 10 is about 8 inches in diameter, and the annular wall 28 of the casing 10 is about 6¾ inches in height. The lead plates 16 and 18 are of conventional design supplied by Battery Plates MFG., 2750 Raymond Avenue, Long Beach, Calif. The plates 16 and 18 are each 3-3/16 inches in width and 5⅝'s inches in height, and six anode plates 16 and six cathode plates 18 are utilized.

Figure 3:
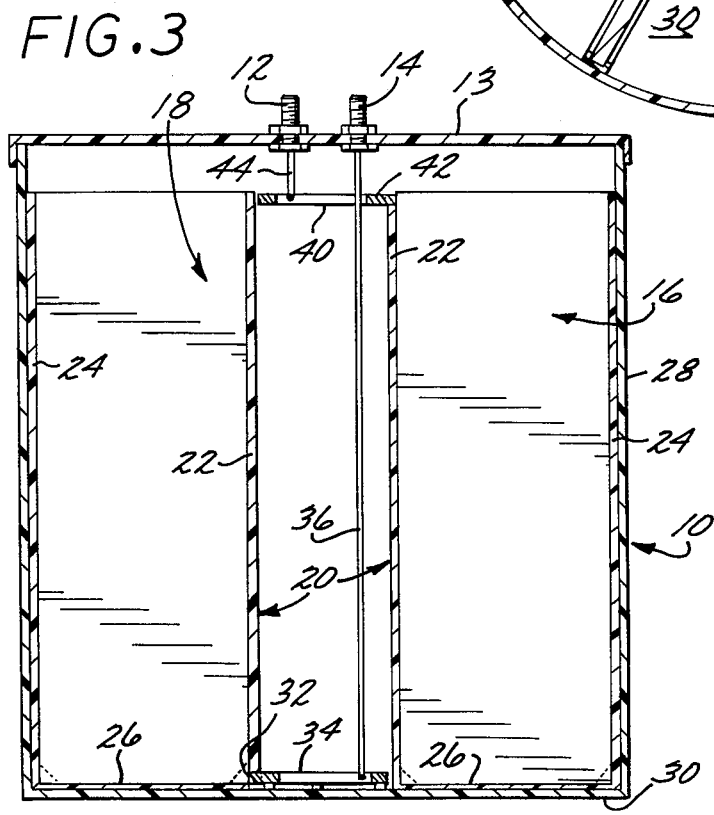
FIG. 3 is a side sectional view taken along the lines 3—3 of FIG. 2.
Figure 4:
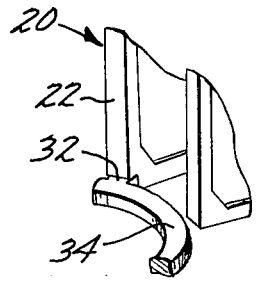
FIG. 4 is a detail view of the plate connection to a conducting ring.

As illustrated in FIGS. 3 and 4, the corners of the interior vertical edge supports 22 of the racks 20 holding the cathode plates 19 are notched at their intersections with the bottom supports 26 so as to expose the lower, inner corner of the cathode plates 18 held therein. Each lower, inner corner of each cathode plate 18 is entrapped and electrically coupled to an electrically conductive contact bracket 32 directed radially outwardly from an electrically conductive contact ring 34 located at the floor 30 of the casing 10. An electrical conductor rod 36 extends vertically upward from secure electrical connection to the contact ring 34 to the terminal post 14. In this way, all of the cathode plates 18 are electrically coupled together to each other and to the battery terminal post 14 through the circular contact ring 34.

Similarly, the upper extremities of the radially interior edge supports 22 are notched or shortened, to expose the upper interior corners of the anode battery plates 16. An upper conductor ring 40 with contact brackets 42 extending therefrom is similarly connected by a conductor rod 44 to the other battery terminal post 14. The contact brackets 42 are electrically coupled to the upper, radially interior corners of the anode plates 16.

As with conventional lead storage batteries, the casing 10 is filled with sulphuric acid and water as an electrolyte. Unlike conventional storage batteries, however, the anode plates 16 and cathode plates 18 are positioned transversely across the cylindrical paths of ionic molecular migration. The paths of ionic migration, as viewed in FIG. 2, are nearly normal to all of the anode plates 16 and cathode plates 18 in the casing 10. This improves the voltage and current stability during battery discharge, and also stabilizes the charge current and charge voltage of the battery as it is recharged.

Comparative data was collected from cycles of charge by the constant current method and data was also collected for discharge. The charging current in amperes and voltage in volts for the charging period, indicated in hours, for the battery of the invention illustrated is set forth in Table 1.

TABLE 1

| hour | 0 | ½ | 1 | 3/2 | 2 | 5/2 | 3 | 7/2 | 4 | 9/2 |
|---|---|---|---|---|---|---|---|---|---|---|
| current | 1.1 | 1.1 | 1.1 | 1.1 | 1.1 | 1.1 | 1.05 | 1.05 | 1.1 | 1.1 |
| voltage | 2.2 | 2.35 | 2.35 | 2.35 | 2.35 | 2.35 | 2.32 | 2.38 | 2.35 | 2.35 |

Table 2 sets forth the discharge current and discharge voltage of the battery of the invention.

TABLE 2

| hour | 0 | ½ | 1 | 3/2 | 2 | 5/2 | 3 | 7/2 | 4 | 9/2 | 5 | 11/2 |
|---|---|---|---|---|---|---|---|---|---|---|---|---|
| current | 0.7 | 0.7 | 0.7 | 0.7 | 0.7 | 0.7 | 0.7 | 0.7 | 0.7 | 0.7 | 0.7 | 0.4 |
| voltage | 2.1 | 2.1 | 2.1 | 2.1 | 2.1 | 2.1 | 2.1 | 2.1 | 2.1 | 2.1 | 2.08 | 1.0 |

As a basis of comparison, the same kind and number of plates 16 and 18 were placed in interleaved fashion and closely spaced in parallel relation in a rectangular container of equal volume as the cylindrical casing 10 and with comparable wiring and experimental conditions. Charge current and voltage and discharge current and voltage of a battery constructed with parallel closely spaced rectangular plates were measured. Charge current and charge voltage for this battery of conventional design are set forth in Table 3.

TABLE 3

| hour | 0 | ½ | 1 | 3/2 | 2 | 5/2 | 3 | 7/2 | 4 | 9/2 |
|---|---|---|---|---|---|---|---|---|---|---|
| ampere | 1.1 | 1.1 | 1.1 | 1.1 | 0.9 | 0.9 | 0.9 | 0.9 | 1.0 | 1.0 |
| voltage | 2.3 | 2.33 | 2.35 | 2.35 | 2.35 | 2.35 | 2.36 | 2.38 | 2.4 | 2.42 |

Table 4 lists the discharge current and discharge voltage of the same battery.

TABLE 4

| hour | 0 | ½ | 1 | 3/2 | 2 | 5/2 | 3 | 7/2 | 4 | 9/2 | 5 | 11/2 |
|---|---|---|---|---|---|---|---|---|---|---|---|---|
| current | 0.7 | 0.65 | 0.63 | 0.62 | 0.62 | 0.62 | 0.6 | 0.6 | 0.6 | 0.6 | 0.6 | 0.5 |
| voltage | 2.1 | 2.1 | 2.09 | 2.09 | 2.08 | 2.08 | 2.06 | 2.05 | 2.05 | 2.02 | 2.0 | 1.5 |

As can be seen from Tables 1-4, when a battery of conventional construction is put on charge by the constant current method, the terminal voltage rises gradually as it moves toward the designated 100 percent condition after 4½ hours of charging in the test models. When the battery of the invention is put on the charge by the constant current method, the terminal voltage of the cell remains constant except for small fluctuations at about the third hour of charging. There is no rise in terminal voltage when it is 100 percent charged. This may be attributed to the orderly motion of the ions within the cylindrical case 10.

As can be seen from Tables 3 and 4, when the battery of conventional construction is put on discharge, both the terminal voltage and terminal current drop gradually until the last half hour, and then more quickly in the last half hour. As is apparent from Table 2, when the battery of the invention is put on discharge, both terminal voltage and terminal current remain the same throughout until the last half hour, and then drop very quickly. This too can be attributed to the orderly circular motion of the electrolyte ions.

Since the capacity of a battery is measured by the product of the discharge-current and the discharge-time, the capacity of the battery of the invention is 12 percent higher than that of the battery of conventional construction. Since the output of a battery in a low terminal voltage condition, about 2.05 volts in the test models, is unusable, the usable capacity of the battery of the invention is 29 percent higher than that of a battery of conventional construction as described.

From the foregoing experiments it can be seen that the battery of the invention is readily adaptable for use as a sole power source in an automotive vehicle. It employs the lead plates already commercially available but in an arrangement which increases the vehicle range and which reduces the necessary frequency of recharging.

Undoubtedly, numerous variations and modifications of the battery of the invention will become readily apparent to those skilled in the art. For example, it is quite apparent that nickel/zinc, nickel/iron and other types of electrical storage batteries may be employed with the design of the invention instead of the lead acid battery construction depicted in the illustrated embodiment. Accordingly, the scope of the invention should not be considered as limited to the specific embodiment depicted, but rather is defined in the claims appended hereto.

I claim:

1. A lead-acid storage battery cell comprising a plurality of upright, flat anode and cathode plates arranged in equally spaced alternation in an upright completely cylindrical casing containing electrolyte throughout, said anodes and cathodes being disposed therewithin in radial alignment in a circle and all of said anode plates are coupled together in parallel and all of said cathode plates are likewise coupled together in parallel.

2. A lead-acid storage battery cell according to claim 1 further characterized in that said flat plates are rectangular.

3. A lead-acid storage battery according to claim 2 further comprising racks having bottom and opposite vertical edge supports for all of said anode and cathode plates.

4. A lead-acid storage battery for use in an electrically powered automotive vehicle, the improvement comprising a plurality of upright flat anode and cathode plates arranged in radial alignment in a circle in equally spaced alternation in an upright completely cylindrical casing containing electrolyte throughout, and said anode plates are all connected in parallel together and said cathode plates are likewise connected in parallel together.

* * * * *